United States Patent [19]
Erskine

[11] Patent Number: 5,784,982
[45] Date of Patent: Jul. 28, 1998

[54] BOAT WINDSHIELD WITH VERTICAL JOINT SYSTEM

[75] Inventor: Edward J. Erskine, Benson, N.Y.

[73] Assignee: N.A. Taylor Co., Inc., Gloversville, N.Y.

[21] Appl. No.: 748,395

[22] Filed: Nov. 13, 1996

[51] Int. Cl.[6] .................................................. B63B 17/00
[52] U.S. Cl. ............................ 114/361; 296/96.021
[58] Field of Search .................................. 114/343, 361, 114/364; 296/84.1, 89, 96.21; 52/204.62, 204.67, 204.68

[56] References Cited

U.S. PATENT DOCUMENTS

| | | | |
|---|---|---|---|
| 3,654,648 | 4/1972 | Wilhoit | 114/361 |
| 3,843,982 | 10/1974 | Lane et al. | 114/361 |
| 5,601,050 | 2/1997 | Erskine et al. | 114/361 |

OTHER PUBLICATIONS

Clear Curve™ Windshield Systems brochure, 1990.
Drawing #96–0497, dated May 13, 1996.
Drawing #95–0360, dated Jul. 10, 1995, Oct. 4, 1995, Nov. 22, 1995.
Drawing #93–0904, dated Oct. 20, 1993.
Die #7371, dated Apr. 2, 1986.
Drawing #90—0418, dated Apr. 26, 1990.
Drawing #02323, dated Nov. 21, 1969.
Drawing #89–0584, dated Jun. 20, 1989, Jun. 19, 1989.
Drawing #90–0417, dated Apr. 20, 1993, Apr. 23, 1993, Apr. 30, 1990.
Drawing #89–1319, dated Dec. 13, 1989, Jan. 9, 1990, Jan. 11, 1990.
Drawing #90–0164, dated Feb. 27, 1990, Mar. 9, 1990, Mar. 14, 1990, Apr. 3, 1990.
Drawing #89–0177, dated Mar. 9, 1989.
Drawing #90–0387, dated Sep. 5, 1990.

*Primary Examiner*—Ed L. Swinehart
*Attorney, Agent, or Firm*—Nixon & Vanderhye P.C.

[57] ABSTRACT

A boat windshield is assembled using a quick connect joint that combines the ease of assembly of conventional push together joints with the strength and aesthetics of conventional slip joints, and may be assembled without accessory fasteners. First and second substantially rigid frame members mount first and second transparent windshield panels, the first frame member having a first, female, side including a recess, and the second frame member having a first, male, side including a hollow projection which is shaped and dimensioned to mate with the recess, and has a first slot defined in it. The recess has a quick connect locking clip extending outwardly from it toward the projection, the locking clip including a channel which cooperates with the first slot to hold the first and second frame members together. Typically at least two first slots and clips are provided in the cooperating frame members, vertically spaced from each other, and the first sides are vertical and mounted to a boat deck. The clip may be held in place in the first frame member merely by the first gasket and first windshield panel.

20 Claims, 4 Drawing Sheets

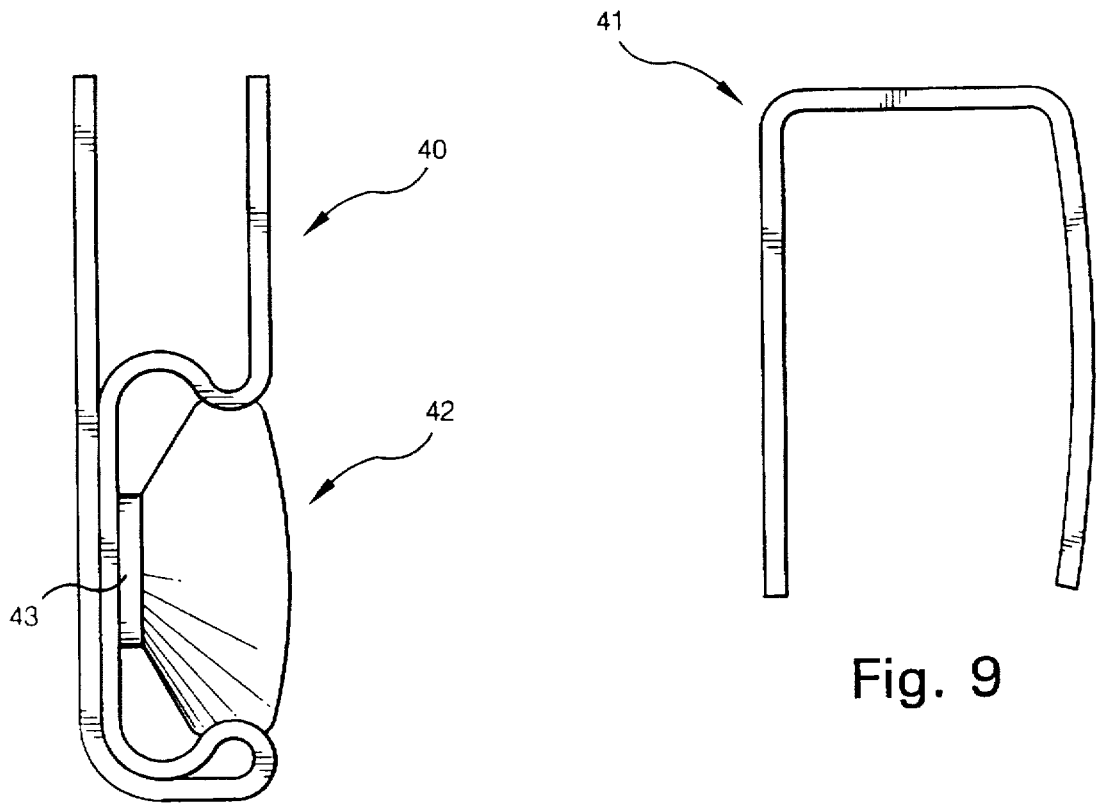
Fig. 7
Fig. 9
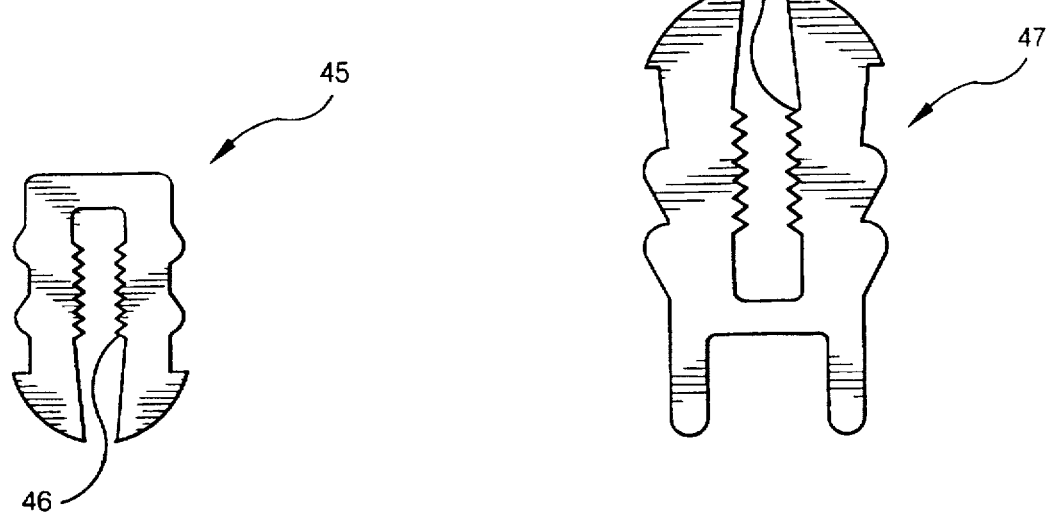
Fig. 8
Fig. 10

BOAT WINDSHIELD WITH VERTICAL JOINT SYSTEM

BACKGROUND AND SUMMARY OF THE INVENTION

It is desirable to be able to quickly, simply, and securely mount boat windshield frames, holding transparent windshield panels, together during the mounting of a boat windshield on a boat. One conventional way of mounting boat windshield frames together is to use aluminum extrusion or rollformed shapes in which a male projection on one frame member slides into a vertically elongated channel in a female frame member. This connection, called a slip joint, provides a solid joint an is aesthetic, however if the frames and panels are large and heavy, or if the frame elements containing the male element or the channel are warped, then it is difficult to slide the components together.

Another conventional construction of boat windshields is provided by using push together joints. In push together joints a male element on one frame member extends into a channel on another frame member, and the accessory fasteners, such as screws, are used to hold the frame members together. While the frame members are easy to push together to put in an initial configuration during assembly, the normally essential procedure of using accessory fasteners to attach the components together significantly deteriorates the aesthetics of the windshield, and also makes it very difficult to form an extremely secure joint.

According to the present invention a boat windshield construction, and method of making a boat windshield, are provided which combine the ease of assembly of the push together joints with the strength and aesthetics of the slip joints. In fact the windshields according to the invention are even easier to assembly than conventional push together joints since no accessory fasteners are necessary in order to hold the interlocking frame elements together, and also there is no chance of scratching the frame members during drilling of holes for the fasteners which is normally required in an assembly procedure of the push together joints. The windshield construction according to the present invention uses the same basic concept of connecting the components together as are used in some conventional shelving systems with cooperating slots and channels, the structures according to the present invention being very simple to make and utilize.

According to one aspect of the present invention a boat windshield is provided comprising the following components: First and second substantially rigid frame members. First and second transparent windshield panels mounted by the first and second frame members, respectively. The first frame member having a first, female, side including a recess. The second frame member having a first, male, side including a projection which is shaped and dimensioned to mate with the recess. The second frame member projection having a first slot defined therein And, the recess having a quick connect locking clip extending outwardly therefrom toward the projection, the locking clip including a channel which cooperates with the first slot to hold the first and second frame members together.

While the locking clip may be attached or mounted in any conventional manner to the first frame first side (e.g. by welding, soldering, adhesive, or fasteners), in the preferred embodiment according to the invention the first frame member first side recess includes a second slot defined therein. The quick connect locking clip comprises a first substantially planar portion having the channel formed therein, and a second, mounting, portion, the second portion extending substantially perpendicular to the first portion. The first portion extends through the second slot and the mounting portion engages the first frame member (either directly so that there is surface-to-surface contact, or indirectly through a gasket, washer, or other intervening component) first side on an opposite side of the first frame member first side from the channel. A first flexible material gasket is disposed in the first frame member and mounts the first transparent windshield panel, the mounting portion of the quick connect locking clip begin held in place with the first portion thereof extending through the second slot by the first flexible material gasket and the first transparent windshield panel only, no accessory structures (such as welds, fasteners, adhesive, or the like) being necessary.

Typically the second frame member first side is elongated in a first dimension and comprises at least two first slots spaced from each other in the first dimension, and the first frame member first side is elongated in the first dimension and comprises at least two second slots and at least two quick connect clips extending through the at least two second slots a d cooperating with the at least two first slots. The clips hold the first sides together without any accessory fasteners along the first sides. Typically the first dimension is substantially vertical, the first and second frame members mounted to a boat deck (typically in a conventional manner).

The second frame member first side includes a second conventional flexible gasket mounting the second transparent windshield panel. Prefer ably the projection is substantially hollow, the second flexible material gasket not extending thereinto (at least adjacent the first slots) so that the second gasket does not interfere with the quick connect clips.

The frame members each typically include at least first, second, and third sides, and often a fourth side, the first and fourth sides being substantially vertical and the fourth side comprising either a female side comprising a recess and clip, or a male side comprising a projection and first slot. At least the first and second sides, and preferably all of the fourth member sides, are of stainless steel sheet material (e.g. approximately 16–20 gauge, most preferably about 18 gauge). However the frame members may be made as aluminum extrusions or plastic extrusions or of other materials known in the art. The quick connect clips typically are made out of metal, such as 18 gauge stainless steel she et material that is bent into the desired configuration, although other substantially rigid materials may also be used therefor.

According to another aspect of the present invention a method of making a boat windshield is provided. The method is practiced using the following components: first and second substantially rigid frame members; first and second transparent windshield panels; first and second flexible material gaskets; the first frame member having a first, female, side, including a recess; the second frame member having a first, male, side including a projection which is shaped and dimensioned to mate with the recess; the second frame member projection having a first slot defined therein; and a quick connect locking clip including a channel. The method comprises the steps of: (a) Assembling the first frame member so that the quick connect locking clip extends outwardly from the recess in the first side of the first frame member and so that the first gasket holds the first windshield panel in the first frame member first side and so that the clip extends outwardly from the recess. (b) Assembling the second frame member so that th e second gasket holds the second windshield panel in the second frame member first side but does not extend into the projection so as to interfere with the first slot. And, (c) moving the first frame member first side and/or the second frame member first side with respect to each other so that the projection extends into the recess and the clip extends through the first slot and the channel receives part of the projection adjacent the first slot therein, so as to hold the first and second frame members together.

The method typically comprises the further step of positioning the first and second frame member first sides so that they are substantially vertical, and mounting them on a boat (in a conventional manner) so that they extend substantially vertically.

Typically the first frame member first side has a second slot therein, and the clip has a first, substantially planar, portion having a channel therein, and a second, mounting, portion extending substantially transverse to the first portion and dimensioned so that it cannot fit through the second slot; and wherein step (a) is practiced by passing the clip first portion through the second slot so that the channel is in the recess, and then putting the first gasket and first windshield panel in place so that the clip mounting portion is held in place by the first gasket and first windshield panel.

The method also may comprise the further step of forming the first and second slots in the frame member first sides by punching with an automatic punch. The method may also comprise the further steps of forming the first and second frame member first sides by bending sheets of stainless steel into the shapes of the first sides. Also in the normal practice of the method the first frame member first side has a plurality of clips in the recess, vertically spaced from each other, and the second frame first side projection has a plurality of first slots for cooperating with the plurality of clips. Step (c) is practiced by moving the first sides so that each of the clips extends through a first slot and the channel thereof receives part of the projection adjacent each first slot therein, so as to hold the first and second frame members together without any accessory fasteners along the first sides.

It is the primary object of the present invention to provide a quick connect joint that is advantageous compared to conventional quick connect joints for boat windshields, and methods of manufacture of boat windshields. This and other objects of the invention will become clear from an inspection of the detailed description of the invention, and from the appended claims.

BRIEF DESCRIPTION OF THE DRAWINGS

FIG. 7 is an e d view of a conventional bottom component of the boat windshield fra e of FIG. 6;

FIG. 8 is an e d view of a conventional gasket that may be utilized in the frame component of FIG. 7, or also in the vertical components of the frame of FIG. 6;

FIG. 9 is an view of an exemplary top component of the frame of FIG. 6; and FIG. 10 is an end view of a gasket utilizable with the top frame component of FIG. 9.

DETAILED DESCRIPTION OF THE DRAWINGS

Figure 1:
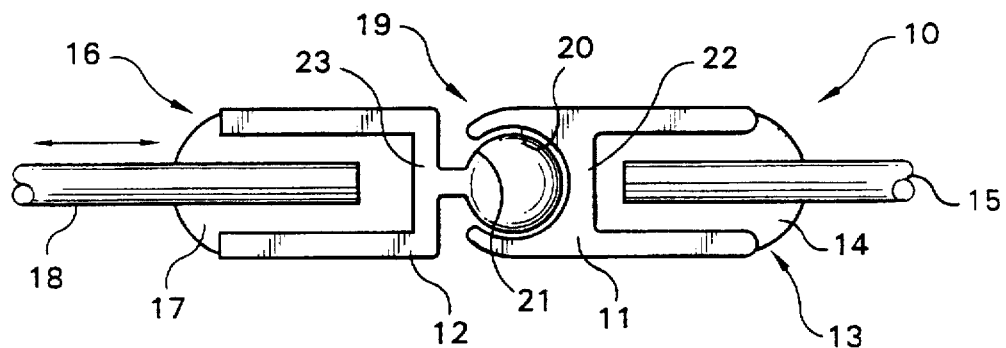
FIGS. 1 and 2 are top plan views of two common conventional vertical joints for connecting frame members together to form a boat windshield.

FIG. 1 illustrates a conventional boat windshield construction 10 which utilizes a "slip together" joint. The assembly 10 includes a first substantially rigid frame member first side 11 and a second substantially rigid frame member first side 12, e.g. typically aluminum extrusions or rollformed shapes. The construction illustrated in FIG. 1 is merely one exemplary configuration, there being a wide variety of different configurations available.

The first frame first side 11 has a channel 13 formed therein into which a conventional flexible material gasket 14 (e.g. rubber or other elastomeric material, vinyl, or the like) is received, holding a first transparent windshield panel 15 (e.g. of glass or plastic) in place. The second frame member first side 12 includes a channel 16 which has a conventional flexible material gasket 17 holding a second conventional windshield panel 18 therein. The slip joint is formed by the female element shown generally by reference numeral 19 which includes a recess 20 therein, and a male element 21 dimensioned and shaped so as to fit within the recess 20. A wall 22 divides the channel 20 from the channel 13, while a wall 23 divides the male element 21 from the channel 16. The dimensions of the components 20, 21 and their configurations are such that the frame components 11, 12 may not be detached (once assembled) if moved in the dimension of the arrows illustrated in FIG. 1. Therefore, to effect assembly one of the components 11, 12 must be moved to a different vertical level than the other and the shapes 20 21 slid into engagement with each other.

While the construction in FIG. 1 provides a good strong joint that is aesthetic be cause there are no accessory fasteners necessary to hold the components 11, 12 together when they are substantially vertically Positioned on a boat deck, if the components 11, 12 of associated panels 15, 18 and other frame elements are large and heavy, or if the components 11, 12 are deformed, then it is difficult to slide the elements 20, 21 with respect to each other.

Figure 2:
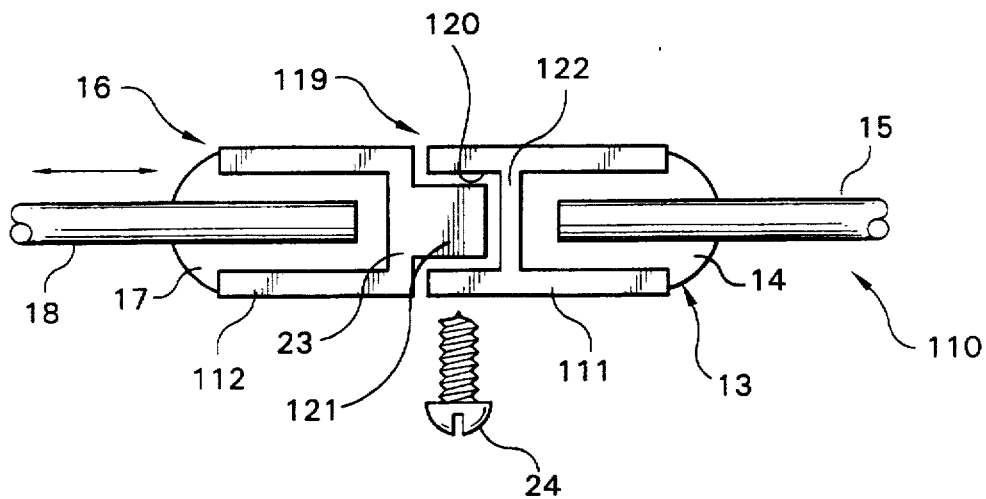

FIG. 2 illustrates another representative prior art construction of the push together joint type, it being understood that FIG. 2 is representative only, there being a wide variety of different configurations that have been utilized to provide such a push together joint. In this embodiment structures the same as those in the FIG. 1 embodiment r shown by the same reference numeral, while structures that are somewhat different but have a similar function are shown by same two digit reference numeral only preceded by a "1".

In the FIG. 2 prior art construction the frame components 111, 112 are pushed together by moving them in the dimension indicated by the arrows n FIG. 2, and once the male element 121 is within the female element/channel 120 it typically is necessary to use an accessory fastener, such as screws 24, to hold the elements 11, 12 together. Normally the holes for receipt of the fasteners 24 cannot be completely preformed in both of the elements 120, 121, therefore some drilling is normally necessary, with the probability that scratching of frame components may occur as a result. In any event while the push together joint construction 110 of FIG. 2 is easier to initially fit together than the construction of FIG. 1, the requirement for the additional fasteners 24 precludes the joint from being exceptionally strong, and significantly harms the aesthetics of the assembly 110.

Figure 3:
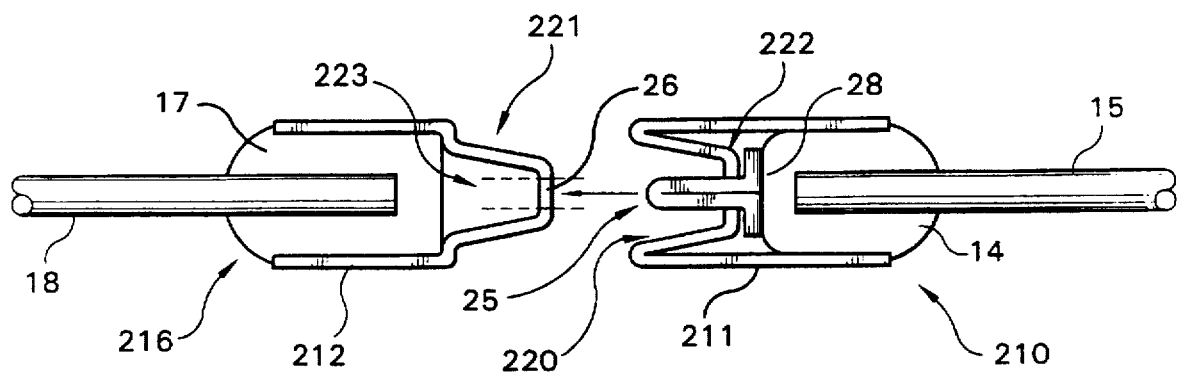
FIG. 3 is a view like that of FIGS. 1 and 2 only for a construction according to the present invention.

According to the l resent invention a novel quick connect joint/assembly 210 (see FIG. 3) is provided which combines the initial ease of assembly of the push together joint of FIG. 2 with the strength and aesthetics of the slip joint of FIG. 1; in fact the construction 210 according to the invention is even easier to assemble than the push together joint of FIG. 2 since no accessory fasteners like the fasteners 24 are necessary or desirable. In FIG. 3 components identical to those in FIG. 1 are shown by the same reference numeral, while components that have a similar function are shown by the same two digit reference numeral only preceded by a "2".

The first rigid frame member first side 211 of the assembly 210, which mounts the first transparent windshield panel 15 with a conventional first flexible gasket 14, includes a recess 220 therein. The second substantially rigid frame member first side 212 includes a male element 221, in the form of a projection (which preferably is hollow over at least a significant length therefrom, and preferably over its entire length). According to the present invention the male projection 221 and the female recess 220 are shaped and dimensioned so that they mate with each other, but rather than requiring accessory fasteners to hold them in place together they are held together by the quick connect locking clip 25 which cooperates with a first slot 26 formed in the projection 221 along its dimension of elongation. While in FIGS. 3 through 5 only one clip 25 and slot 26 are visible, it is to be understood that in a desirable boat windshield construction according to the present invention preferably two, or even more, clips 25 and associated slots 26 are preferably provided.

Figure 4:
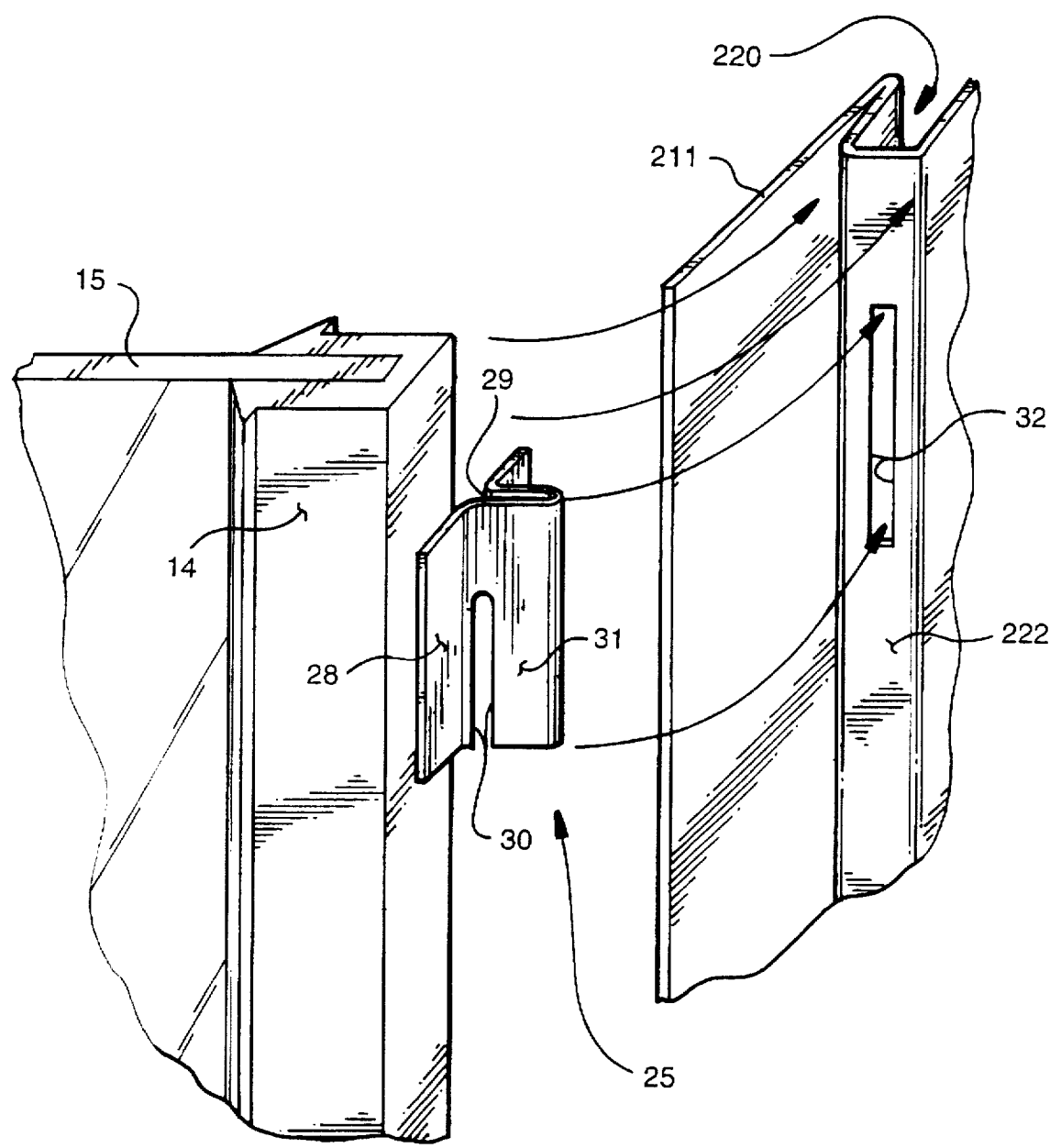
FIG. 4 is a schematic perspective view showing the manner of assembly of the female frame first (vertical) side in the preferred embodiment according to the present invention.
Figure 5:
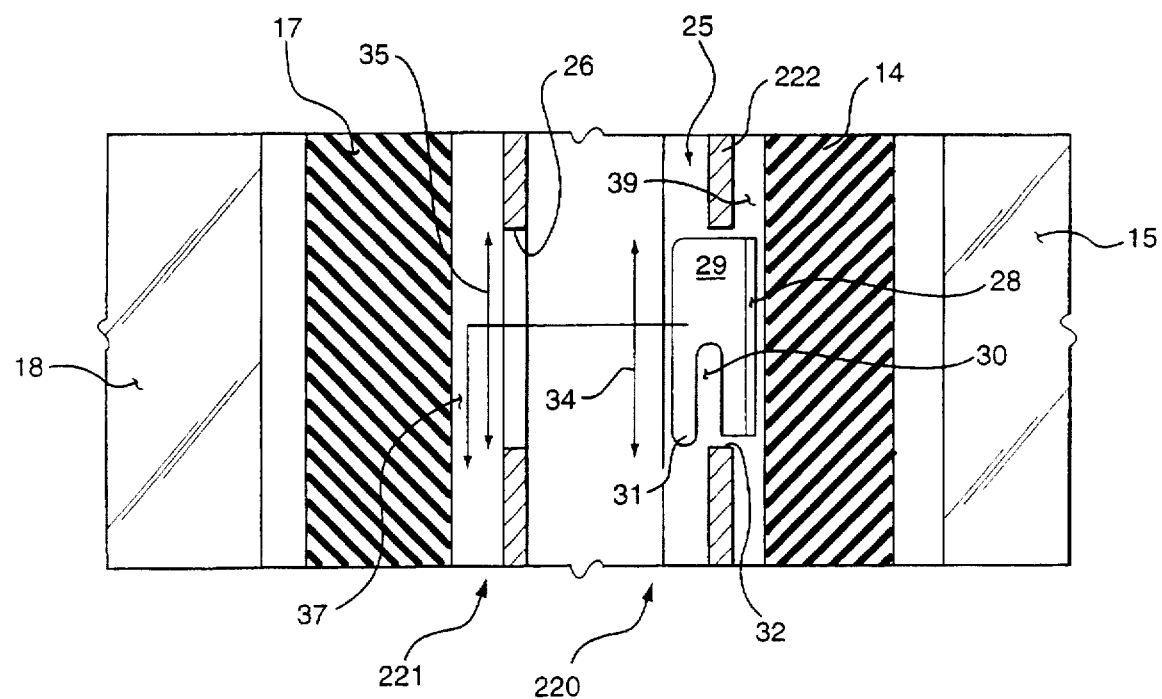
FIG. 5 is a longitudinal detail view, partly in cross-section and partly in elevation, illustrating interconnection of the frame components of FIGURE

The preferred construction of the clip 25 is best seen in FIGS. 4 and 5, and includes a first portion 29 which is substantially planar and has a channel 30 formed therein with a mounting portion 28 on one side of the channel and a flange portion 31 of the planar portion 29 on the opposite side of the channel 30 from the mounting portion 28. Th mounting portion preferably also is substantially planar and extends in a dimension substantially transverse to the substantially planar first portion 29. The clip 25 may be made of a wide variety of substantially rigid and corrosion resistant materials, such as rigid plastics and aluminum. In the preferred construction illustrated in the drawings, however, clip 25 is formed by bending a sheet of stainless steel, e.g. about 18 gauge 304 alloy stainless steel.

The clip 25 may, depending upon the materials of construction, be formed integrally wit the frame component 211, or—if a separable structure—the clip 25 may be permanently secured, or releasably secured, to the component 211 such as by using a weld, solder, adhesive, or even fasteners such as rivets or screws. However, the simplest, easiest, and most desirable construction is as illustrated in FIGS. 3 through 5 in which a second slot 32 is punched from or otherwise formed in the all 222, as seen most clearly in FIG. 4. The slot 32 has approximately the same dimensions (length and thickness) as the first portion 29 of the clip 25 so that the first portion 29 passes through the slot 32. However the mounting portion 28 is dimensioned and configured so that it cannot pass through the slot 32 and it engages the wall 222, preferably directly, but if desired indirectly through a washer, spacer, gasket, or the like. In any event once the clip 25 is properly inserted into the frame component 211 the channel 30 is within the recess 220 while the mounting portion 28 is on the opposite side of the wall 222 from the recess 220 and channel 30. The clip 25 is then held in place merely by assembling the gasket 14 and window panel into the frame side 211, the gasket 14 and panel 15 thus holding the clip 25 securely in place.

The slot 26, as seen most clearly in FIG. 5, is elongated in the dimension 34, the same as the dimension of elongation of the clip 25 when properly positioned, and the first and second frame member first sides 211, 212. The slot 26 has a length 35 in the dimension 34 which is slightly greater than the length of the clip 25, and the channel 30 has a width which is slightly greater than the thickness of the end wall 36 of the projection 221 in which the slot 26 is formed. Preferably the slot 26 is formed in the wall 36 by punching using an automatic punch. The width of the slot 26 is also slightly greater than the thickness of the first portion 29 of the clip 25. To move the clip 25 into operative association with the projection 221, it is moved as indicated by the lines 37 in FIG. 5, first being moved horizontally so that the portion 29 passes through the slot 26, and once the slot 26 and the channel 30 are aligned, moved downwardly so that the wall 36 is received within the channel 30.

As schematically seen in FIG. 5, a bead of caulk or strip of foam (e.g. a foam gasket 39 may be provided-in the recess 220 to seal the elements 221, 222 to minimize water seepage between them.

Figure 6:
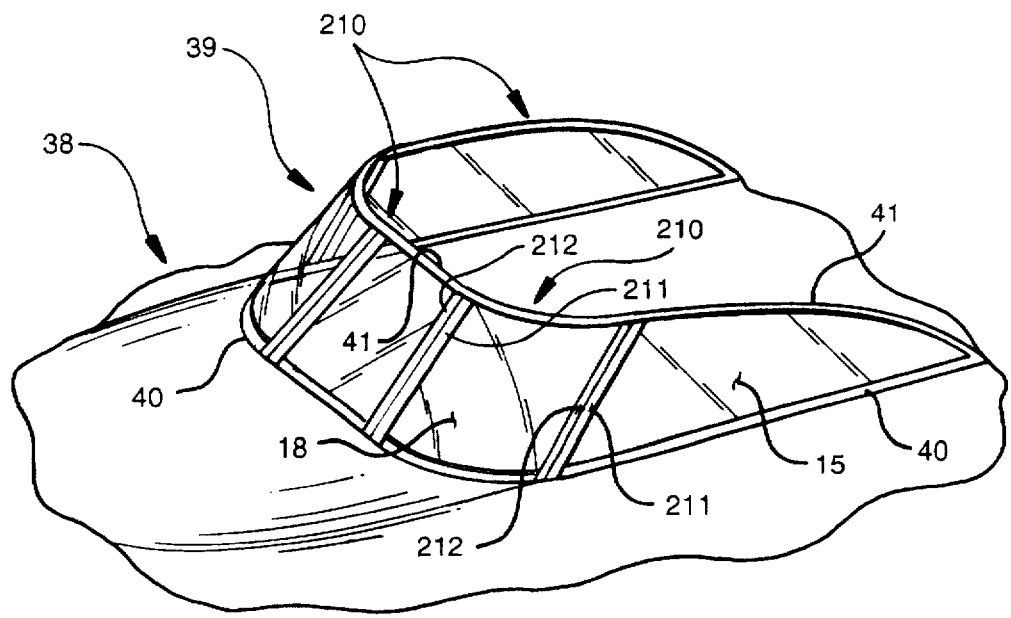
FIG. 6 is a to schematic perspective view of a boat windshield constructed according to the present invention.

FIG. 6 shows a windshield construction 39 according to the invention mounted on an exemplary boat 38. Each frame member forming part of the wind shield construction 39 comprises at least one of the components 211, 212, a bottom frame component 40 and a top frame component 41. In the exemplary construction illustrated in FIG. 6 except for th two end frame members which are generally triangular in configuration, all of the other frame members have four sides, including first an fourth sides which comprise the components 211, 212, or two components 211, or two components 212. The sides 211, 212 extend substantially vertically (i.e. from exactly vertical to as much as swept backwardly about 30°). The windshield assembly 39 is mounted to the boat 38 in any suitable conventional manner.

While the other frame components, such as the components 40, 41, can have a wide variety of different configurations, one specific configuration thereof that may be utilized in the formation of the windshield assembly 39 according to the present invention is seen in FIGS. 7 through 10.

FIG. 7 shows the bottom frame member 40, which may have a foam screw cover 42 (e g. made from EPDM sponge), conventional screws (not shown) passing through the lowermost portion of the frame bottom 40 into the boat deck or into an accessory structure connected to the boat deck. The screw cover 42 may be held in place by a strip of adhesive 43. The open t p channel of the bottom frame component 40 receives the gasket therein, such as the conventional flexible gasket 45 is (FIG. 8) which has an interior channel 46 that receives the transparent panel 15, 18 therein.

FIG. 9 shows a typical configuration (an end view) of the top frame member 41, which typically receives a gasket such as the flexible material gasket 7 (FIG. 10) therein. The gasket 47 has has a channel 48. The channel 48 opens downwardly to receive the top portion of the windshield panel 15, 18 therein.

In the practice of the method according to the present invention, the clip 25 is assembled in the first frame member first side 211 as schematically illustrate (in FIG. 4. The windshield panel 15 is held in place by the frame member first side 11 when so assembled. The second frame member first side 212 is assembled so that the second gasket 17 holds the second windshield panel 18 in place but does not extend into the hollow projection 221. Then the frame member first sides 211, 212 are moved with respect to each other (moving either one or both) so that the clip 25 first portion 29 passes through the slot 26, and then is moved downwardly so that the wall 36 is received within the channel 30, for all of the clips 25 associated with the sides 211, 212. The windshield frame members are then assembled with respect to each other and there is no need for accessory screws or other fastener to hold the sides 211, 212 together, and thus they may simply be mounted to construct a windshield assembly 39, as illustrated in FIG. 6.

While the invention has been herein shown and described in what is presently conceited to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A boat windshield comprising:

first and second substantially rigid frame members;

first and second transparent windshield panels mounted by said first and second frame members, respectively;

said first frame member having a first, female, side including a recess;

said second frame member having a first, male, side including a projection which is shaped and dimensioned to mate with said recess;

said second frame member projection having a first slot defined therein; and said recess having a quick connect locking clip extending outwardly therefrom toward said projection, said locking clip including a channel which cooperates with said first slot to hold said first and second frame members together.

2. A boat windshield as recited in claim 1 wherein said first frame member first side recess includes a second slot defined therein; and wherein said quick connect locking clip comprises a first substantially planar portion having said channel formed therein, and a second, mounting, portion shaped and dimensioned so that it cannot fit through said second slot, said second portion extending substantially perpendicular to said first portion; and wherein said first portion extends through said second slot and said mounting portion engages said first frame member first side on an opposite side of said first frame member first side from said channel.

3. A boat windshield as recited in claim 2 further comprising a first flexible material gasket disposed in said first frame member and mounting said first transparent windshield panel; and wherein said mounting portion of said quick connect locking clip is held in place with said first portion thereof extending through said second slot by said first flexible material gasket and said first transparent windshield panel.

4. A boat windshield as recited in claim 3 wherein said first flexible gasket material pressing said mounting portion toward said first frame member first side so that said first portion extends through said second slot comprises the only means for holding said clip in place.

5. A boat windshield as recited in claim 2 wherein said second frame member first side is elongated in a first dimension and comprises at least two first slots spaced from each in said first dimension; and wherein said first frame member first side is elongated in said first dimension and comprises at least two second slots and at least two quick connect clips extending through said at least two second slots and cooperating with said at least two first slots.

6. A boat windshield as recited in claim 1 wherein said second frame member first side is elongated in a first dimension and comprises at least two first slots spaced from each in said first dimension; and wherein said first frame member first side is elongated in said first dimension and comprises at least two quick connect clips cooperating with said at least two first slots, said clips holding said first sides together without any accessory fasteners along said first sides.

7. A boat windshield as recited in claim 6 wherein said first dimension is substantially vertical, and said first and second frame members are mounted to a boat deck.

8. A boat windshield as recited in claim 1 wherein said second frame member first side includes a second flexible material gasket mounting said second transparent windshield panel; and wherein said projection is substantially hollow, said second flexible material gasket not extending thereinto at least adjacent said first slot so that said second gasket does not interfere with said quick connect clip.

9. A boat windshield as recited in claim 3 wherein said second frame member first side includes a second flexible material gasket mounting said second transparent windshield panel; and wherein said projection is substantially hollow, said second flexible material gasket not extending thereinto at least adjacent said first slot so that said second gasket does not interfere with said quick connect clip.

10. A boat windshield as recited in claim 7 wherein said second frame member first side includes a second flexible material gasket mounting said second transparent windshield panel; and wherein said projection is substantially hollow, said second flexible material gasket not extending thereinto at least adjacent said first slots so that said second gasket does not interfere with said quick connect clips.

11. A boat windshield as recited in claim 1 wherein said frame member first sides are of stainless steel sheet material, and further comprising a bead of caulk or strip of foam in said first frame member recess.

12. A boat windshield as recited in claim 1 wherein said frame members each include at least first, second and third sides, all of said sides of stainless steel sheet material.

13. A boat windshield as recited in claim 1 wherein at least one of said first and second frame members includes first, second, third and fourth sides; and wherein said first and fourth sides are substantially vertical, said frame members mounted to a boat deck; and wherein said fourth side comprises either a female side comprising a said recess and clip, or a male side comprising a said projection and first slot.

14. A boat windshield as recited in claim 13 wherein at least said first and fourth sides are of approximately 16–20 gauge stainless steel sheet material.

15. A method of making a boat windshield using: first and second substantially rigid frame members; first and second transparent windshield panels; first and second flexible material gaskets; the first frame member having a first, female, side, including a recess; the second frame member having a first, male, side including a projection which is shaped and dimensioned to mate with the recess; the second frame member projection having a first slot defined therein; and a quick connect locking clip including a channel; said method comprising the steps of:

(a) assembling the first frame member so that the quick connect locking clip extends outwardly from the recess in the first side of the first frame member and so that the first gasket holds the first windshield panel in the first frame member first side and so that the clip extends outwardly from the recess;

(b) assembling the second frame member so that the second gasket holds the second windshield panel in the second frame member first side but does not extend into the projection so as to interfere with the first slot; and (c) moving the first frame member first side and/or the second frame member first side with respect to each other so that the projection extends into the recess and the clip extends through the first slot and the channel receives part of the projection adjacent the first slot therein, so as to hold the first and second frame members together.

16. A method as recited in claim 15 comprising the further step of positioning the first and second frame member first sides so that they are substantially vertical, and mounting them on a boat so that they extend substantially vertically.

17. A method as recited in claim 16 wherein the first frame member first side has a second slot therein, and wherein the clip has a first, substantially planar, portion having the channel therein, and a second, mounting, portion extending substantially transverse to the first portion and dimensioned so that it cannot fit through the second slot; and wherein step (a) is practiced by passing the clip first portion through the second slot so that the channel is in the recess, and then putting the first gasket and first windshield panel in place so that the clip mounting portion is held in place by the first gasket and first windshield panel.

18. A method as recited in claim 17 comprising the further step of forming the first and second slots in the frame member first sides by punching with an automatic punch.

19. A method as recited in claim 17 comprising the further step of forming the first and second frame member first sides by bending sheets of stainless steel into the shapes of the first sides.

20. A method as recited in claim 16 wherein the first frame member first side has a plurality of clips in the recess, vertically spaced from each other, and wherein the second frame first side projection has a plurality of first slots for cooperating with the plurality of clips; and wherein step (c) is practiced by moving the first sides so that each of the clips extends through a first slot and the channel thereof receives part of the projection adjacent each first slot therein, so as to hold the first and second frame members together without any accessory fasteners along the first sides.

* * * * *